(12) United States Patent
Williams, Sr.

(10) Patent No.: US 6,227,232 B1
(45) Date of Patent: May 8, 2001

(54) WATER CONTAINMENT AND DRAINAGE DEVICE FOR AN ACTIVATED SPRINKLER HEAD

(76) Inventor: Anthony L. Williams, Sr., 2429 N. Maplewood, Chicago, IL (US) 60647

( * ) Notice: Subject to any disclaimer, the term of this patent is extended or adjusted under 35 U.S.C. 154(b) by 0 days.

(21) Appl. No.: 09/421,603

(22) Filed: Oct. 20, 1999

(51) Int. Cl.⁷ .......................... F16L 35/00; F16L 11/112; F16K 23/00
(52) U.S. Cl. ............... 137/312; 137/355.16; 137/355.28; 141/86; 169/91; 222/108; 239/120; 285/8
(58) Field of Search ............................... 137/312, 355.16, 137/355.28; 141/86; 169/37, 90, 91; 222/108; 239/104, 120, 121, 124; 285/8, 13

(56) References Cited

U.S. PATENT DOCUMENTS

| | | | |
|---|---|---|---|
| 2,780,430 | * 2/1957 | Pokryfke | 137/355.28 |
| 3,091,251 | * 5/1963 | Hughey | 137/355.28 |
| 3,749,118 | * 7/1973 | Berg | 137/355.28 |
| 4,380,269 | * 4/1983 | Petaway et al. | 137/355.28 |
| 4,557,289 | * 12/1985 | Kasnick | 137/355.28 |
| 6,102,066 | * 8/2000 | Craig et al. | 137/312 |

* cited by examiner

Primary Examiner—George L. Walton
(74) Attorney, Agent, or Firm—John D. Long

(57) ABSTRACT

A water containment and drainage device for activated sprinkler heads to limit the water damage to the buildings containing such fire or accident activated sprinkler heads. The device comprises of a sprinkler head receiving and water container portion, a drainage portion and a positioning apparatus. The sprinkler head receiving and water container portion comprises of a flexible, non-collapsible, fully posable tube whose interior forms a water receptacle area. An open end of the tube reversibly receives the activated sprinkler head into a water receptacle area formed by the interior of the tube. The other end of the tube is connected to one end of the drainage portion which comprises of a non-collapsible hose of determined length so that the water receptacle area and the interior of the hose are in continuous union. Both the diameters of the water receptacle area and the hose are of sufficient size to accommodate the containment and drainage of the water emanating from the activated sprinkler head without a resulting buildup of water pressure. The other end of the hose is remotely located from the sprinkler head to an area suitable for the reception of the water emitted form the activated sprinkler head. The positioning apparatus which the operator uses to place and secure the device over the activated sprinkler comprises long handled two prong fork wherein the prongs of the fork are moveably connected to the tube so the tube can pivot between prongs to assist the proper positioning of the tube relative to that of the activated sprinkler head.

20 Claims, 4 Drawing Sheets

WATER CONTAINMENT AND DRAINAGE DEVICE FOR AN ACTIVATED SPRINKLER HEAD

BACKGROUND OF THE INVENTION

This invention pertains in general to devices that are used to contain and drain water emissions from either accidental or actual operation of sprinkler heads of fire suppression systems.

Today many municipalities prudently mandate through their fire and building codes that buildings, both old and new construction, be outfitted with pressurized internal water sprinkler systems. These systems are intended to enhance occupant safety and to promote the public welfare through fire containment. While the most stringent requirements are placed on buildings that function as public gathering places, such as schools, churches, hospitals, performance centers and government structures, other buildings, such as commercial work places, factories, warehouses, high-rises, and multiple housing units, both residential and commercial, are also required to have sprinkler systems. As a result of this government action, water sprinkler systems are becoming a common presence in virtually every building, public and private that can accommodate large numbers of people.

The need for such water sprinkler systems in public buildings is well known. They contain the spread of or extinguish fires that may occur within the building. This purpose is accomplished, when the heat from a present fire triggers the affected sprinkler heads to cause them to release pressurized water within their system. The activated sprinkler heads then deliver into the affected areas of the building interior high volumes of water that are sprayed out to every corner of the facility by the sprinkler head to effect fire suppression.

It is the design of these systems to drown a fire inside of the building. During every minute of operation a single sprinkler head, and the entire system may contain hundreds if not thousands of these heads all located very near the ceiling at spaced intervals, tens of gallons of water. Beyond the extinguishing of fires, it is also well known that water introduced by the system can cause significant and costly damage to virtually any structure. As a result, buildings that have had their sprinkler systems activated, or just a single sprinkler head malfunction, can suffer both cosmetic and structural water damage.

In the case of a multiple story building, the operation of the sprinkler head on an upper floor, due to gravity, naturally causes water damage to the floors below as the expended water seeks to drain out of the building. Very often these buildings are not designed to drain the large volume amount of water introduced by the sprinkler making it highly likely that water will move into areas that are especially susceptible to damage.

Once activated, it is acknowledge that sprinkler systems can be particularly difficult to shut down quickly. In many cases a significant delay exists between the time that the need for the sprinkler system's operation has ceased and the time when the system is successfully shut down. Generally, sprinkler systems employ a water cut-off valve or a series of water cut-off valves that stop the water supply to the sprinkler system or portion thereof, thereby shutting down the sprinkler system. However, the locating and then operating this valve or the series of valves can prove to be very time consuming. Even greater time delays in effecting a shut down may be encountered when the valve or set of valves is not located within the general vicinity of an operating sprinkler head or the entire system. In other instances, the valve or set of valves may be located in a secured area accessible only to certain authorized building personnel, more often referred to as the "person with the key". During every minute of this delay water continues to course into the building interior. This water translates directly into costly damage.

The prior art discloses various attempts to containing and draining water form sprinkler heads to prevent damage to building.

In the United States patent issued to Hansel, U.S. Pat. No. 5,752,540, the invention is used during repairs or replacement being effected upon the sprinkler head. The invention used a sturdily constructed tube sock to be securely clamped upon the pressurized, non-operating sprinkler head to contain and drain any pressurized water released. This invention does not adequately address the problem of water containment and drainage with an operating sprinkler head. The device can not be quickly and easily placed onto the sprinkler head, nor is it quickly removed. Further, it is designed on to handle small amount of water, released from a pressurized system that has been shut down for repairs and is not in operation.

The United States patent issued to Rye, U.S. Pat. No. 5,344,193, discloses an invention specifically tasked to attempt to contain, channel and drain water from an activated sprinkler head. The Rye invention demonstrates a water containment and drainage device for an activated sprinkler head that is either ceiling or wall mounted. The device is a multi-piece pipe-like container that is assembled on site with an open collared aperture at one end and a hose at the other end. A telescopic pole is attached to the container, to lift and position the container near the activated sprinkler head. In operation, the operator using the pole lifts the invention so that a collared aperture of the device lines up with the operating sprinkler head. The container is pushed onto the sprinkler head so that such that sprinkler head is forced into the aperture and the container. The container collects the water spray and then channels it into an attached hose providing a conduit for the water to move away from the sprinkler and to a suitable drainage facility in the building such as sink, toilet, window or fire stairway. To facilitate its use for horizontally projecting sprinkler heads that are wall mounted, the container can be fitted with an elbow shaped tube at its aperture end.

The prior art however does not fully address problems unique to older buildings being retrofitted with water sprinkler systems. Many older buildings were never designed to have water sprinkler systems installed in the first place. As such, they were not created to have the physical spaces that are needed to ensure that a regular sprinkler system could be placed to ensure that once activated the system would be able to adequately discharge water so as to meet the minimum water coverage requirements necessary for effective fire suppression. To meet these code mandated minimum water coverage requirements, retrofitters have to sometimes place sprinkler heads in an odd position, at an odd angle, or at an odd location. Neither the Rye invention nor Hansel invention adequately addressees oddly mounted sprinkler heads that are found in sprinkler systems retrofitted in older buildings.

Hansel, U.S. Pat. No. 5,752,540, in being used for drainage of non-activated sprinkler heads, does not set forth a means for positioning and placing the device over an activated sprinkler head.

Rye, U.S. Pat. No. 5,344,193, is not adapted to be applied to sprinkler heads that are mounted in a wide variety of positions and locations in older buildings to allow the sprinkler system to meet water coverage mandates.

For ceiling mounted sprinkler heads, the Rye invention can handle those sprinkler heads which descend from the bottom of the sprinkler water supply pipe. However, in many exposed ceiling building such as warehouses or factories, the sprinkler heads are mounted on the top of the sprinkler water supply pipe. The Rye invention would not be able to accommodate such top mounted ceiling sprinklers since the sprinkler water supply pipe would prevent the Rye invention from properly enveloping the top mounted ceiling sprinkler head.

For wall mounted sprinkler heads, the Rye invention uses a fixed positioned elbow pipe adapter or a cup-shaped universal adapter (for different types of sprinkler heads) horizontally mounted (90 degree) sprinkler heads. Since the adapter is rigid, it could not be positioned easily to accommodate the oddly angled or positioned sprinkler heads that are becoming quite common, as older buildings become retrofitted with sprinkler systems.

Finally, post fire conditions in which the Rye invention would be used are generally not conducive to devices like the Rye on-site assembly or an operation of the multiple assembly invention. It would be not be easy to assemble a multi-piece equipment, selecting different attachments to go on the equipment in a dark, smoke filled, waterlogged (and hence slippery surfaced) room where an sprinkler system has be activated.

SUMMARY OF THE INVENTION

It is the primary object of this invention to provide an inexpensive, easily manufactured, operator friendly, reliable, pre-assembled water containment and drainage device that can be easily operated, located and secured over activated sprinkler heads that can be located in a wide variety of positions so as to limit water damage to the building where the activated sprinkler head is located.

It is a further objective of this invention to comprise of an container portion for reversible receipt of the sprinkler head and containing the water emanating therefrom; with the container portion being pivotally attached to a positioning portion to allow the placement of the invention for accommodation of sprinkler heads that are placed in a wide variety of angles or positions, and a drainage portion coupled to the container portion for closed removal of the water collected by the container portion to a remotely located drainage facility.

It is a further object of this invention to be used on sprinkler systems being retrofitted to buildings.

It is a further object of the invention to have a container portion comprised of an elongated flexible tube that can be posed in a wide variety of positions to accommodate the wide variety of positions and placement angles of sprinkler heads.

It is a further object of the invention to have a container portion comprised of an elongated flexible tube of sufficient resiliency that it can be reused and reposed to accommodate activated sprinkler heads that are placed in other positions, placement and angles.

It is a further object of this invention to have a container portion that can be adapted to accommodate sprinkler heads that are mounted on the topside of sprinkler water supply pipe for a ceiling sprinkler system.

It is a further object of the invention to be able to have a guiding flange that makes it easier to locate the invention onto a sprinkler head.

It is a further object of this invention to have a pre-assembled water containment and drainage device that can be easily installed and operated under adverse conditions.

It is a further object of the invention to have a drainage portion comprising of flexible non-collapsing hose to prevent the collapsing and blockage of the drainage portion when during operation it is pulled against a sharp edge such as corner or caught in a doorway.

It is a further object of the invention to be able to internally communicate the water from an activate sprinkler head to a drainage receptive site remote from the activated sprinkler head internally in the invention without a significant buildup of water pressure within the invention.

DETAILED DESCRIPTION OF PREFERRED EMBODIMENT

Figure 1:
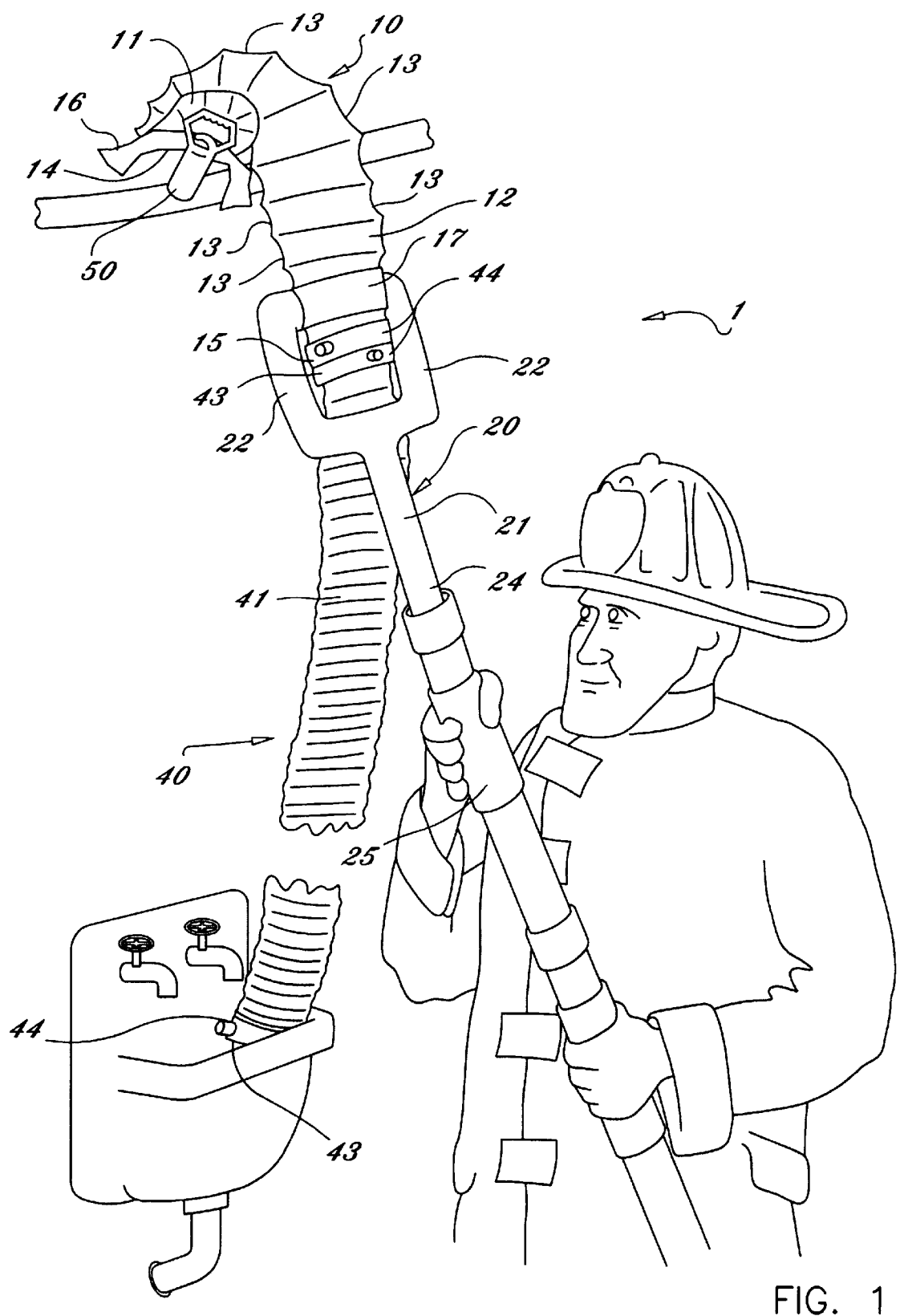
FIG. 1.) A perspective view of the invention being used to receive an oddly positioned sprinkler head.

The drawings show the invention, a water containment and drainage device for open water sprinklers heads embodying the present invention is indicated generally by the reference numeral 1.

Figure 2:
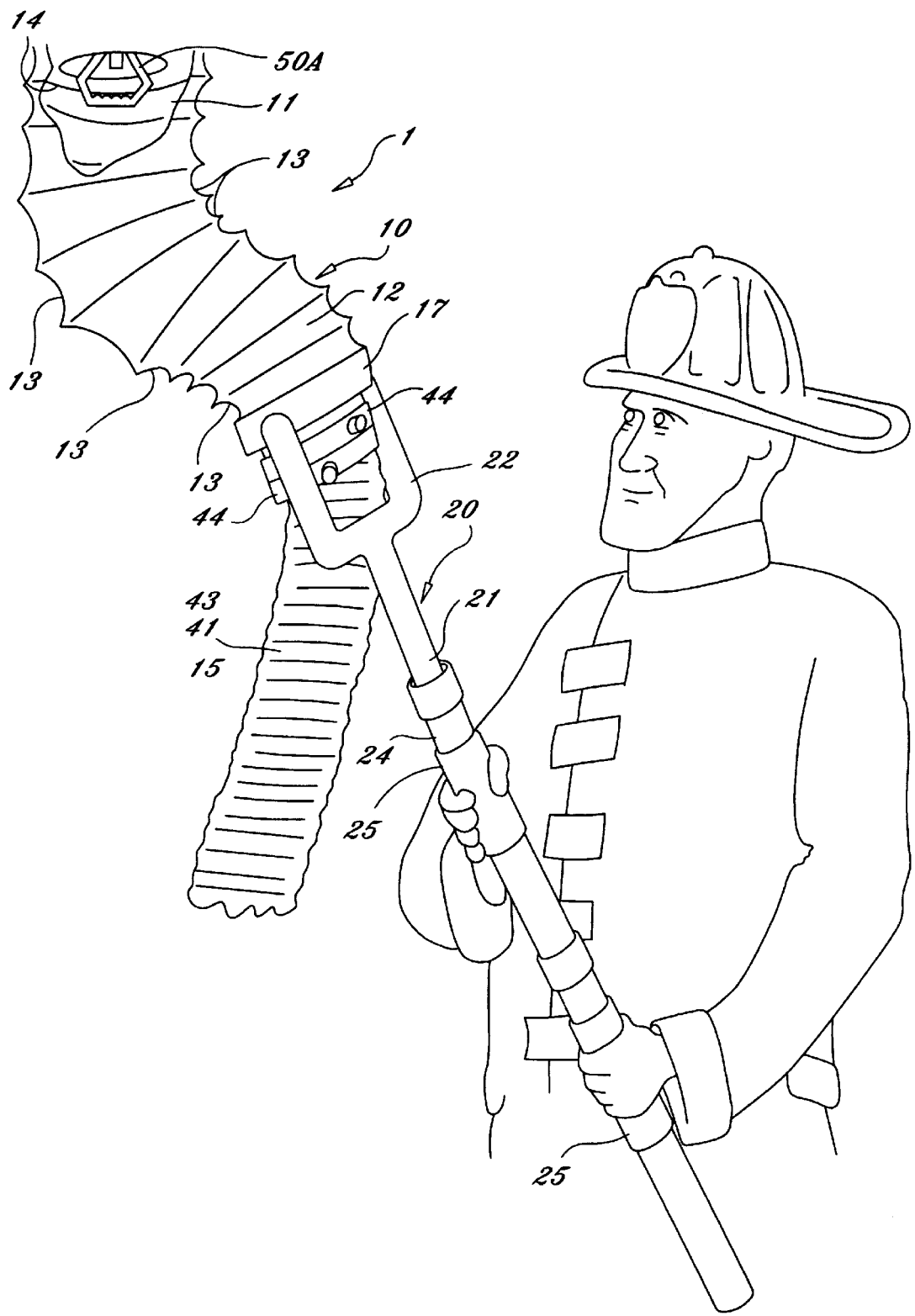
FIG. 2.) A perspective view of the invention with the adapter being used to receive topside mounted ceiling recessed sprinkler head.

In FIGS. 1 and 2, the invention 1 is to being positioned over a sprinkler head 50 that is oddly positioned; similar to those sprinkler heads found in older buildings retrofitted with sprinkler systems. The flow of water from the sprinkler head 50 is omitted for the purposes of clarity.

The invention 1 comprises of a container portion 10 whose interior forms the water containment receptacle 11 for reversibly enveloping at least a portion of an activated sprinkler head 50 and containing the water being released by the activated sprinkler head 50. The drainage portion 40 is in a continuous union with the water containment receptacle 11 so as to be able to conduct the water received by the water containment receptacle 11 to an area remote from the activated sprinkler head 50 that is suitable for the receiving the water discharged from the activated sprinkler head 50. The container portion 10 is pivotally connected to a positioning portion 20 that is used to place and hold the container portion 10 onto an activated sprinkler head 50 so as to direct the flow of water emanating from the activated sprinkler head 50 into the water containment receptacle 11. A securing mechanism 30 reversibly holds the container portion 10 in the posed position relative to the positioning portion 20.

The container portion generally denoted as 10 comprises of a tube 12 of predetermined length that in the preferred embodiment the tube 12 has a series of circumferential folds 13 of an accordion type which allows the user to pose the tube in a wide variety of positons without causing collapse of the tube. In an alternative embodiment, the tube 12 is similar in construction to similar to flexible tubing used in HVAC construction in that it has circumferential folds 13 similar to those found in a flexible poseable drinking straw.

The tube 12 is constructed to have sufficient resilience so that when as the user poses the tube 12 to match the position and the angle of the activated sprinkler head 50, the circumferential folds 13 will hold their respective positions in the pose until the user reposes the tube 12. The tube 12 is flexible enough that the it can be reposed and used over again for other applications involving differently located and angled activated sprinkler heads 50. In the preferred embodiment, the tube is contracted out of aluminum, although in an alternate embodiment, the construction material for the tube 12 can be plastic.

The tube 12 has two apertures, a sprinkler head receiving aperture 14 and a drainage aperture 15. In an alternative embodiment, the sprinkler head receiving aperture 14 has mounted on it an elastomeric resilient funnel shaped annular flange 16 which is used to help guide the sprinkler head receiving aperture 14 over the activated sprinkler head 50. The sprinkler head receiving aperture 14 has sufficiently large diameter to accommodate the passage of the activated sprinkler head as well as to be able to encompass the opening of a recess for a recessed ceiling mounted activated sprinkler head 50A. In this manner, the tube can be posed and positioned so that when sprinkler head receiving aperture 14 is placed over at least a portion of the recessed ceiling mounted activated sprinkler head 50A so as to engage a portion of the ceiling surrounding the opening of the recess as to be able to cover the opening of recess with water containment receptacle 11 thus directing the water emanating from the recessed ceiling mounted activated sprinkler head 50A into the water containment receptacle 11.

The tube 12 also has a band 17 placed on the tube's 12 outer circumference so as to be located near the drainage aperture 15. The band 17 can be made of suitable plastic or metal. The inner diameter of the band 15 closely matches the outer diameter of the tube 12 so that the band 15 is snugly adhered to the outside of the tube 12 by force fit, although another attachment means such as adhesive can be used. To facilitate the moveable attachment of the container portion 10 to the positioning apparatus 30, there are two pivot attachment pins 18 located 180 degrees apart from one another on the outside circumference of the band 15.

The positioning apparatus 20 is a long handled two prong fork 21, wherein the prongs 22 of the long handled two prong fork 21 have receptacles 23 on the their inside tips that pivotally receive the pivot attachment pins 18 of the band 17 to allow the container portion 10 to movably connect to the prongs 22 and allow the tube 12 to pivotally move between the prongs 22. This pivoting action further aids in positioning of the container portion 10 relative to the position and angle of the activated sprinkler head 50. The size and shape of the container portion 10 determines the overall shape and size of the prongs 22.

Figure 3:
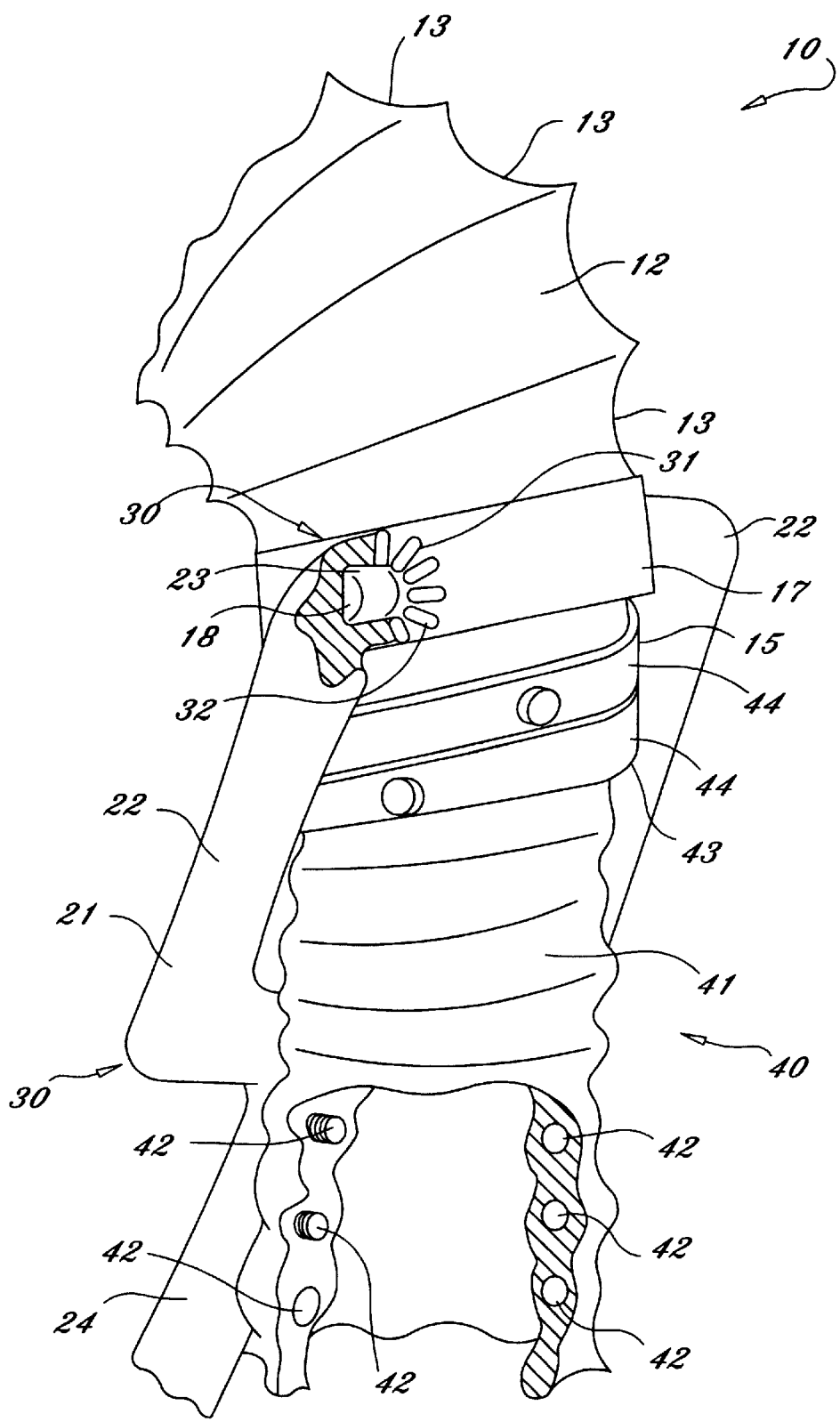
FIG. 3.) A perspective, partial view of the invention showing the ridge-tab engagement system for water container and container holder.

As shown in FIG. 3, a securing mechanism 30 is used to reversibly lock the position of the tube 12 relative to the prongs 22. This securing mechanism aids the operator in orienting the tube 12 relative to the position, angle and placement of the activated sprinkler head 50. In the preferred embodiment, the securing mechanism 30 is comprised of a tab 31 located on the tip of each prong 22 near the edge of the each of the receptacles 23 and projecting outward to frictionally engage as set of indentations 32 located on the outer surface of the band and radially surround the base of each pivot attachment pins 18. Other embodiments of the securing mechanism would include a snug friction fit between the pivot attachment pins 18 and the receptacles 23; or a use of a ratchet; or other securing devices well known to the practitioner.

The handle 24 of the long handled two prong fork 21 has appropriate non-slip hand grips 25 to allow firm handling of the invention by the user in a wet or slippery environment. The hand grips 25 are placed to afford the user an offset placement grip used by most fire department personnel in handling pole-type devices. The handle 24 in the preferred embodiment is telescopically adjustable.

The drainage portion generally denoted as 40 is a non-collapsible, flexible hose 41 of predetermined length with two open terminal ends 42. The hose 41 is of a flexible non-collapsing type which have rings 42 circumferentially embedded in their walls. The rings prevent the hose 31 from being pinched or collapsed if it is brought into close contact with a corner or doorway, etc. during operation. Otherwise, if the hose 31 is of a collapsible type it can be pinched off during operation it will allow a backup of the drainage of water emanating from the activated sprinkler head 50. The resulting water pressure from the accumulating backup could then cause the container portion 10 to be blown off the activated sprinkler head 50.

The non-collapsible, flexible hose 41 is attached by one open terminal end 42 to the drainage aperture 15 of the tube 12 so that the interior of the hose 31 is in continuous union with the water containment receptacle 11. In the preferred embodiment, to provide for reversible connection of the drainage aperture 15 to an open terminal end 42, the open terminal ends 42 and the drainage aperture 15 are fitted with standard quick fit threaded connector fittings 44 which are the standard connectors for fire hoses. The other terminal end 32 of the hose 31 is remotely located from the activated sprinkler head 50 at a site favorable to the acceptance of the drainage of the water emitted by the activated sprinkler head 50.

In an alternative embodiments, the connection of hose 41 to the drainage aperture 15, is accomplished by having the outer circumference of a open terminal end 43 of the hose 41 closely matches the inner circumference of the drainage aperture 15 so that the hose 41 reversibly and snugly fits into the drainage aperture 15. It is also envisioned that the permanent attachment means such as adhesive could be used to attach the hose 41 into the drainage aperture 15.

When it is necessary to reach a remote site which is favorable for receiving the drainage of water that emanated from the activated sprinkler head 50 and is too far away to be reached by the a single predetermined length of hose 41, in the additional units of predetermined length of hose 41 can be coupled to the hose 41 that is originally connected to the container portion 10 to achieve an overall length of hose 41 which is sufficient enough to reach the remote site.

The diameter of water containment receptacle 11 and the inner diameter of the hose 41 are of sufficient size to allow the unimpeded flow of the water through the invention 1 to the selected remote site without any significant buildup of water pressure within the invention 1. By having the invention 1 designed to averting a buildup of water pressure, the invention 1 can be constructed of lighter, thinner and more inexpensive materials than a water drainage device designed to withstand any significant water pressure.

Figure 4:
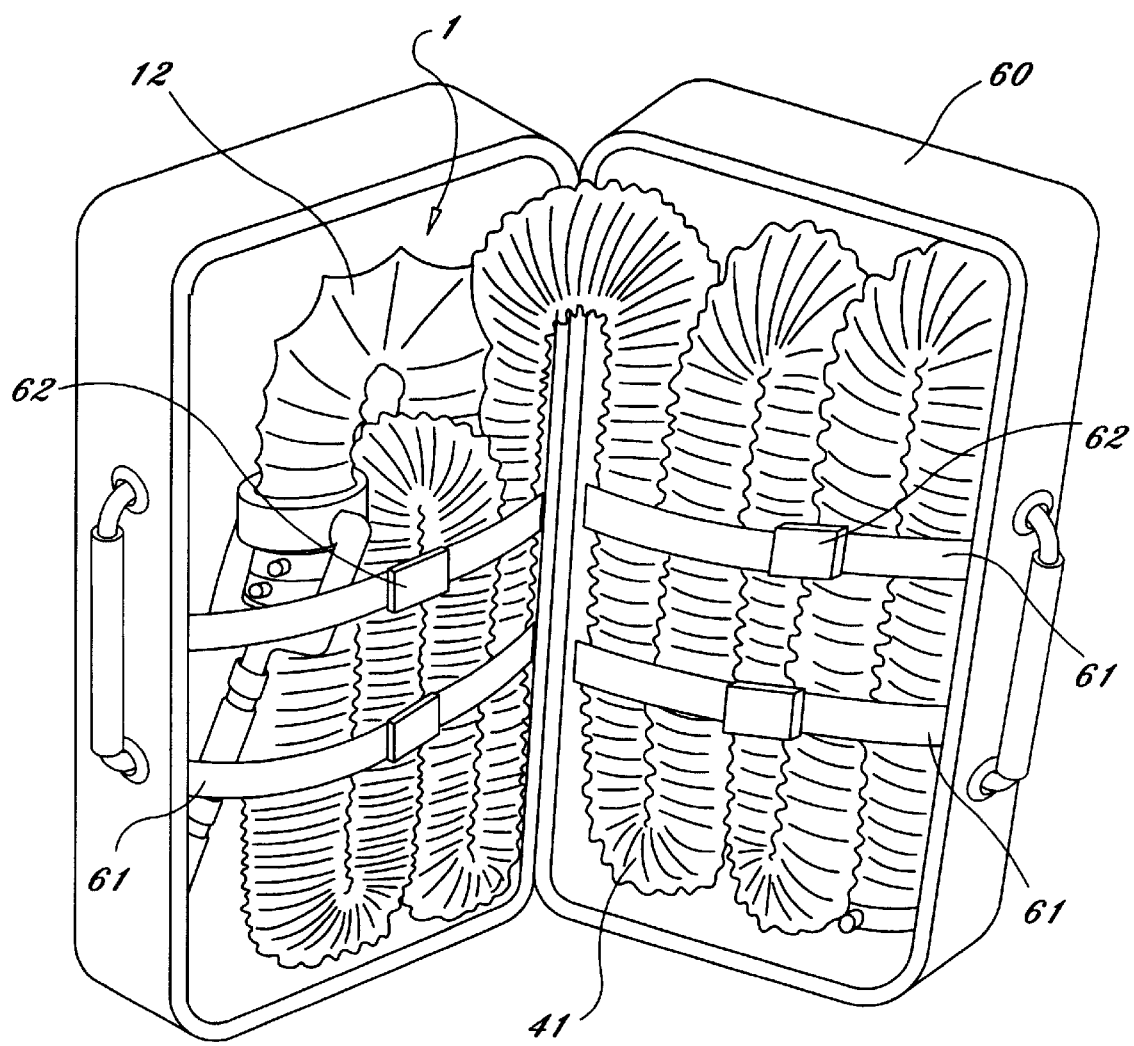
FIG. 4.) A perspective, view of the invention in its compacted state stored within its carrying bag.

The invention 1, as shown in FIG. 4 is stowed preassembled in a storage bag 60 of a flexible suit case design, until it is needed. The invention 1 is stored with the container portion 10, long handle two prong fork 20 with the handle 24 telescopically compacted, and at least a portion of the hose 31 strapped to the interior of one side of the storage bag 60. The other interior side of the storage bag 60 has the remaining portion of the hose 41 folded and strapped to it. The invention 1 is retained in place in the interior of the storage bag 60 by straps 61 on the fastened by closures 62 such as buckles or Velcro® attachments.

In operation, the storage bag 60 with the invention 1 is carried to the position closest to the to the activated sprinkler head 50. The invention 1 is taken out of its storage bag 60 and the hose 31 is unwrapped from the long handle two-prong fork 20. The operator poses the tube 12 so as to conform the tube 12 to the position and placement of the activated sprinkler head 50. The operator can further adjusts the tube 12 between the prongs 22 of the long handle two-prong fork 23 so to ensure the proper posing of the tube 12 in relation to the activated sprinkler head 50. The securing mechanism 30 then holds the tube in place in relation to the prongs 22. The operator then places unconnected open terminal end 43 of the hose 41 so that it will drain out to a suitable area remote from the activated sprinkler head 50 site. The operator can connect additional lengths of hoses 31 together if necessary to reach a water drainage site whose location is beyond the reach of a single predetermined length of hose 31. The operator then telescopically extends the handle 24 of long handle two-prong fork 23 to the proper length and then clasps the hand grips 25 to position the sprinkler head receiving aperture 14 over the activated sprinkler head 50. The operator then positions the invention 1 so that the tube 12 envelops, at least partially, the activated sprinkler head 50 so as to contain and direct the water from the activated sprinkler head 50 to the hose 31 for drainage to a suitable site remote form the activated sprinkler head 50. The operator holds the invention 1 in place until the water is shut off to the activated sprinkler head 50.

I claim:

1. A water containment and drainage device for an activated operating sprinkler head comprising of a container portion the interior of which forms a sprinkler receiving and water containment receptacle that reversibly envelopes at least a portion of a activated sprinkler head and collects the water being released from the sprinkler head, said container portion including a poseable tube, a positioning portion pivotally attached to the container portion for positioning and holding the said container portion in place over the activated sprinkler head and a drainage portion connected to the container portion so as be in a continuous communication with the sprinkler receiving and water containment receptacle so as to be able to channel the water collected in a sprinkler receiving and water containment receptacle and delivering it to a selected location remote from said container portion, wherein said poseable tube being universally adapted to receive various sized sprinkler heads placed at different orientations and locations.

2. A water containment and drainage device for said sprinkler head as set forth in claim 1 wherein the container portion is pivotally attached to the positioning portion.

3. A water containment and drainage device for said sprinkler head as set forth in claim 2 wherein a securing apparatus is used to reversibly fix the position of the collector portion relative to the positioning portion.

4. A water containment and drainage device for said sprinkler head as set forth in claim 3 wherein said positioning portion is a long handled two prong fork.

5. A water containment and drainage device for said sprinkler head as set forth in claim 4 wherein the handle of the long handled two prong fork is telescopically adjustable.

6. A water containment and drainage device for said sprinkler head as set forth in claim 4 wherein the handle of the long handled two prong fork has hand grips that are positioned on the handle to provide an offset grip.

7. A water containment and drainage device for said sprinkler head as set forth in claim 1 wherein the drainage portion is reversible attached to the container portion.

8. A water containment and drainage device for said sprinkler head as set forth in claim 1 where in the tube is posed to match the positioning, placement and angle of the activated sprinkler head.

9. A water containment and drainage device for said sprinkler head as set forth in claim 8 wherein the tube is flexible and non-collapsible.

10. A water containment and drainage device for said sprinkler head as set forth in claim 9 wherein the tube has circumferential accordion folds.

11. A water containment and drainage device for said sprinkler as set forth in claim 1, wherein the drainage portion is flexible non-collapsible hose of a determined length.

12. A water containment and drainage device for said sprinkler as set forth in claim 11 wherein the flexible non-collapsible hose is reversibly attached to said container portion.

13. A water containment and drainage device for said sprinkler as set forth in claim 12 wherein the flexible non-collapsible hose can be coupled with other hoses to provide sufficient length so as to provide an overall combined length sufficient to reach a selected location remote from said container portion for the proper disposal of collected water.

14. A water containment and drainage device for said sprinkler as a set forth in claim 1 wherein the container portion diameter and the diameter drainage portion are sufficient size to allow the unimpeded communication of collected water through the device to a location remote from said sprinkler head.

15. A water containment and drainage device for said sprinkler as a set forth in claim 14 wherein the unimpeded communication occurs without a buildup of water pressure within said device.

16. A water containment and drainage device for said sprinkler as a set forth in claim 14 wherein the container portion diameter closely mates with the diameter of said drainage portion so as to provide a snug and water tight friction fit.

17. A water containment and drainage device for said sprinkler head as set forth in claim 1 wherein said device is pre-assembled and stored in a compact state within a bag for easy storage and transport.

18. A water containment and drainage device for a concealed activated operating sprinkler head that is mounted above a ceiling having and opening therethrough below said sprinkler head comprising of a container portion the interior of which forms a sprinkler receiving and water containment receptacle that reversibly envelopes at least a portion of a activated sprinkler head and collects the water being released from the sprinkler head, said container portion including a poseable tube, one of the elements of the poseable tube being a sprinkler head receiving aperture whose diameter is larger than the diameter of the opening of the ceiling, positioning portion pivotally attached to the container portion for positioning and holding the container portion in place over said sprinkler head so that sprinkler head receiving aperture engages a portion of ceiling surrounding the opening and a drainage portion connected to the container portion so as be in a continuous communication with the sprinkler receiving and water containment receptacle so as to be able to channel the water collected in a sprinkler receiving and water containment receptacle and delivering it to a selected location remote from said collecting means, wherein the poseable tube can be posed to universally receive different sized sprinkler heads placed in various orientations and locations.

19. A water containment and drainage device for said sprinkler as a set forth in claim 18 wherein the container portion diameter and the diameter drainage portion are sufficient size to allow the unimpeded communication of collected water through the device to a location remote from the operating sprinkler head.

20. A water containment and drainage device for said sprinkler as a set forth in claim 19 wherein the unimpeded communication occurs without a buildup of water pressure within said device.

* * * * *